United States Patent
Seo et al.

(10) Patent No.: US 9,496,928 B2
(45) Date of Patent: Nov. 15, 2016

(54) METHOD OF COOPERATIVE TRANSMISSION BASED ON CONTROL INFORMATION RECEIVED FROM MULTI-CELLS IN WIRELESS COMMUNICATION SYSTEM

(75) Inventors: Han Byul Seo, Anyang-si (KR); Byoung Hoon Kim, Anyang-si (JP)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 13/132,896

(22) PCT Filed: Jan. 5, 2010

(86) PCT No.: PCT/KR2010/000030
§ 371 (c)(1),
(2), (4) Date: Jun. 3, 2011

(87) PCT Pub. No.: WO2010/079933
PCT Pub. Date: Jul. 15, 2010

(65) Prior Publication Data
US 2011/0243085 A1 Oct. 6, 2011

Related U.S. Application Data

(60) Provisional application No. 61/143,384, filed on Jan. 8, 2009.

(30) Foreign Application Priority Data

Apr. 1, 2009 (KR) .................. 10-2009-0028195

(51) Int. Cl.
H04B 7/02 (2006.01)
H04W 52/40 (2009.01)

(52) U.S. Cl.
CPC ............ H04B 7/024 (2013.01); H04W 52/40 (2013.01)

(58) Field of Classification Search
None
See application file for complete search history.

(56) References Cited

U.S. PATENT DOCUMENTS 7,139,328 B2 * 11/2006 Thomas et al. ............... 375/299
2005/0157808 A1 * 7/2005 Ihm et al. ..................... 375/267
(Continued)

FOREIGN PATENT DOCUMENTS

KR 10-2006-0013069 2/2006
KR WO2007052966 A2 * 5/2007
(Continued)

OTHER PUBLICATIONS

Korean Intellectual Property Office Application Serial No. 10-2009-0028195, Office Action dated Feb. 26, 2015, 5 pages.

*Primary Examiner* — Yemane Mesfin
*Assistant Examiner* — Peter Chen
(74) *Attorney, Agent, or Firm* — Lee Hong Degerman Kang Waimey

(57) ABSTRACT

A method and apparatus of cooperative transmission performed by a transmitter having a multi-antenna in a multi-cell is provided. A first data stream is transmitted to a first base station through a first data layer, and A second data stream is transmitted to a second base station through a second data layer. The first data stream and the second data stream may be generated from different codewords and are respectively mapped to the first data layer and the second data layer.

2 Claims, 7 Drawing Sheets

(56) References Cited

U.S. PATENT DOCUMENTS

| | | | |
|---|---|---|---|
| 2006/0089144 A1* | 4/2006 | Kim et al. | 455/439 |
| 2006/0120477 A1* | 6/2006 | Shen et al. | 375/267 |
| 2007/0104128 A1* | 5/2007 | Laroia et al. | 370/329 |
| 2007/0248172 A1 | 10/2007 | Mehta et al. | |
| 2008/0170634 A1* | 7/2008 | Kwak et al. | 375/260 |
| 2008/0187062 A1* | 8/2008 | Pan et al. | 375/260 |
| 2008/0209301 A1* | 8/2008 | Chang | H04L 1/1607 714/749 |
| 2008/0303699 A1* | 12/2008 | Zhang et al. | 341/67 |
| 2009/0046800 A1* | 2/2009 | Xu et al. | 375/267 |
| 2009/0067364 A1* | 3/2009 | Chang | H04L 1/1607 370/315 |
| 2009/0154424 A1* | 6/2009 | Oyabu | 370/331 |
| 2009/0233544 A1* | 9/2009 | Oyman et al. | 455/7 |
| 2009/0310556 A1* | 12/2009 | Ishii et al. | 370/329 |
| 2010/0054353 A1* | 3/2010 | Roh et al. | 375/260 |
| 2010/0110967 A1* | 5/2010 | Sartori et al. | 370/315 |
| 2010/0208687 A1* | 8/2010 | Lim et al. | 370/329 |
| 2010/0238872 A1* | 9/2010 | Kim et al. | 370/329 |

FOREIGN PATENT DOCUMENTS

| | | |
|---|---|---|
| KR | 10-2007-0086976 | 8/2007 |
| KR | 10-2008-0018147 | 2/2008 |
| KR | 10-2008-0085382 | 9/2008 |

\* cited by examiner

METHOD OF COOPERATIVE TRANSMISSION BASED ON CONTROL INFORMATION RECEIVED FROM MULTI-CELLS IN WIRELESS COMMUNICATION SYSTEM

CROSS-REFERENCE TO RELATED APPLICATIONS

This application is the National Stage filing under 35 U.S.C. 371 of International Application No. PCT/KR2010/000030, filed on Jan. 5, 2010, which claims the benefit of earlier filing date and right of priority to Korean Application No. 10-2009-0028195, filed on Apr. 1, 2009, and also claims the benefit of U.S. Provisional Application Ser. No. 61/143,384, filed on Jan. 8, 2009, the contents of all of which are incorporated by reference herein in their entirety.

TECHNICAL FIELD

The present invention relates to wireless communication, and more particularly, to cooperative communication between cells in a multi-cell environment.

BACKGROUND ART

The next-generation multimedia wireless communication systems that are being actively researched in recent years are required to process various pieces of information, such as video and radio data, as well as the initial voice-centered services at the higher data transmission rate.

Orthogonal Frequency Division Multiplexing (OFDM) capable of having a high data transmission rate has recently been in the spotlight. OFDM is a multi-carrier modulation scheme of dividing a frequency band into a number of orthogonal subcarriers and sending data. Orthogonal Frequency Division Multiple Access (OFDMA) is a scheme for combining Frequency Division Multiple Access (FDMA), Time Division Multiple Access (TDMA), Spatial Division Multiple Access (SDMA), or Code Division Multiple Access (CDMA) with OFDM and providing the multiplexing of multiple users.

A wireless communication system includes a Base Station (BS) and one or more Mobile Stations (MSs). The mobile station can be fixed or mobile and can be referred to as another terminology, such as a User Equipment (UE), a User Terminal (UT), a Subscriber Station (SS), or a wireless device. In general, the base station refers to a fixed station that communicates with the mobile stations, and it can be referred to as another terminology, such as a Node-B, a Base Transceiver System (BTS), or an access point. Hereinafter, uplink (UL) transmission refers to transmission from a mobile station or a relay station to a base station or transmission from a mobile station to a relay station. Downlink (DL) transmission refers to transmission from a base station to a mobile station or a relay station or transmission from a relay station to a mobile station.

A wireless communication system has a cell structure for an efficient system configuration. A cell refers to that a wide area is divided into small areas in order to efficiently use the frequency. In general, a base station placed at the center of the cell provides relay for mobile stations, and the cell refers to a service area provided by one base station.

If, in a multi-cell environment, neighbor cells having the OFDM/OFDMA system use the same subcarrier, it can become the cause of interference for users. This is called inter-cell interference. In particular, such inter-cell interference becomes a big problem to a mobile station or a relay station placed near the boundary of a cell. In downlink, a mobile station placed near the boundary of a cell is subject to strong interference from neighbor cells. In uplink, a mobile station or a relay station placed near the boundary of a cell provides strong interference to neighbor cells and also has a low transmission rate because of the loss of a path in a serving cell.

To reduce such inter-cell interference, different subcarriers can be used between neighbor cells. This method, however, is problematic in that radio resources that can be used by one base station are reduced.

A multi-cell cooperation method has been proposed to reduce inter-cell interference in a multi-cell environment. If the multi-cell cooperation method is used, the communication performance of mobile stations or relay stations placed near the boundary of a cell can be improved. Several discussions are in progress in relation to a method of transmitting and processing data using the multi-cell cooperation method.

DISCLOSURE OF INVENTION

Technical Problem

There can be several methods for improving the performance of a transmitter, such as a mobile station or a relay station. Of the methods, several multi-cell cooperation methods, chiefly in relation to the downlink, have been proposed. In the uplink, a macro diversity method in which a signal sent by one mobile station is received by several base stations and the signals received by the several base stations are then combined together is being taken into consideration.

However, the conventional macro diversity scheme requires a process of exchanging the reception signals between the base stations in order to decode data. It results in an increased latency for data decoding and also leads to problems, such as that the Quality of Service (QoS) requirements of data are not satisfied or decoding is not completed until a point of time at which an Acknowledge (ACK) or Non-acknowledgement (NACK) message will be transmitted by a base station.

In particular, in the case in which one of base stations participating in cooperation is a wireless relay station or a femto base station, it is very difficult to use the macro diversity scheme because the wireless relay station or the femto base station does not directly connect to other cooperation base stations over a wired network.

In the conventional macro diversity scheme, the multi-user multiple-input and multiple-output (MIMO) is used over multiple cells, which may result in poor efficiency. In the case in which the multi-user MIMO is used, if some of data transmitted by a mobile station placed at the boundary of a cell are connected to a base station other than a serving base station, the efficiency of the entire system can be increased.

In particular, in the case in which a mobile station placed at the boundary of a cell is not allowed for transmission of a high rank through a channel toward its own serving base station, but a neighbor base station takes part in reception, the transmission of a high rank can be facilitated. In the existing method, however, a more efficient operation cannot be performed because a precoding matrix or transmission power used for transmission by a mobile station is determined by only a serving base station which represents connection with the mobile station.

Solution to Problem

In an aspect, a method of cooperative transmission performed by a transmitter having a multi-antenna in a multi-cell is provided. The method includes transmitting a first data stream to a first base station through a first data layer, and transmitting a second data stream to a second base station through a second data layer, wherein the first data stream and the second data stream are generated from different codewords and are respectively mapped to the first data layer and the second data layer. The method may further include receiving a first Acknowledge (ACK)/Non-Acknowledgement (NACK) messages, corresponding to the transmission of the first data stream, and a second ACK/NACK messages, corresponding to the transmission of the second data stream, from the first base station and the second base station, respectively. The method may further include receiving a scheduling message, comprising information about radio resources to be assigned for the transmission of the first data stream and the second data stream, from one of the first base station and the second base station. The scheduling message may further comprise index information about base stations which will send ACK/NACK messages for the first data stream and the second data stream. The method may further include receiving information about latency, which is generated until ACK/NACK messages are transmitted, before receiving the ACK/NACK messages. The scheduling message may further comprise at least one of power control information, precoding matrix information, and Modulation and Coding Scheme (MCS) information. The method may further include receiving a first reference signal and a second reference signal from the first base station and the second base station, respectively, and calculating a first path loss estimation value and a second path loss estimation value from the first reference signal and the second reference signal, respectively, wherein a transmission power for the first data stream and a transmission power for the second data stream are controlled based on the first path loss estimation value and the second path loss estimation value, respectively, and a plurality of data streams are transmitted according such power control.

In another aspect, a method of cooperative transmission performed by a transmitter having a multi-antenna in a multi-cell is provided. The method include transmitting a first data stream to a first base station through a first data layer, and transmitting a second data stream to a second base station through a second data layer, wherein the first data stream and the second data stream are generated from a single codeword and are mapped to each of the first data layer and the second data layer. The first base station and the second base station may be the same base station. The method may further include receiving ACK/NACK messages, corresponding to the first data stream and the second data stream, from one of the first base station and the second base station. The method may further include receiving a first reference signal and a second reference signal from the first base station and the second base station, respectively, and calculating a first path loss estimation value and a second path loss estimation value from the first reference signal and the second reference signal, respectively, wherein a transmission power for the first data stream and a transmission power for the second data stream are controlled based on the first path loss estimation value and the second path loss estimation value, respectively, and a plurality of data streams are transmitted according such power control.

In another aspect, a method of cooperative transmission performed by a transmitter having a multi-antenna in a multi-cell is provided. The method include receiving a first scheduling message, comprising information about radio resources to be assigned for transmission of a first data stream, from a first base station, receiving a second scheduling message, comprising information about radio resources to be assigned for transmission of a second data stream, from a second base station, transmitting the first data stream to the first base station through a first data layer, and transmitting the second data stream to the second base station through a second data layer. At least one of the first scheduling message and the second scheduling message may further comprise at least one of power control information, precoding matrix information, and MCS information. At least one of the first scheduling message and the second scheduling message may further comprise index information about base stations which will send ACK/NACK messages for the first data stream and the second data stream.

In another aspect, a method of cooperative transmission performed by a transmitter having a multi-antenna in a multi-cell is provided. The method include receiving a scheduling message, comprising information about radio resources to be assigned for transmission of a first data stream and a second data stream, from one of a first base station and a second base station, transmitting the first data stream to the first base station through a first data layer in response to the scheduling message, and transmitting the second data stream to the second base station through a second data layer in response to the scheduling message. The scheduling message may further comprise index information about base stations which will send ACK/NACK messages for the first data stream and the second data stream. The method may further include receiving information about latency, which is generated until ACK/NACK messages are transmitted, before receiving the ACK/NACK messages. The scheduling message may further comprise at least one of power control information, precoding matrix information, and MCS information.

Advantageous Effects of Invention

According to some embodiments of the present invention, in a multi-cell environment, a mobile station can send several data to a number of base stations which have a cooperative relationship with the mobile station, and the reliability of data transmission can also be secured.

Further, according to some embodiments of the present invention, in the case in which a mobile station sends data to several base stations using the MIMO method, power control or the transmission and reception of a control signal is not necessarily performed by a serving base station. Accordingly, a mobile station can flexibly deal with channel situations between base stations and can perform an efficient operation.

MODE FOR THE INVENTION

Figure 1:
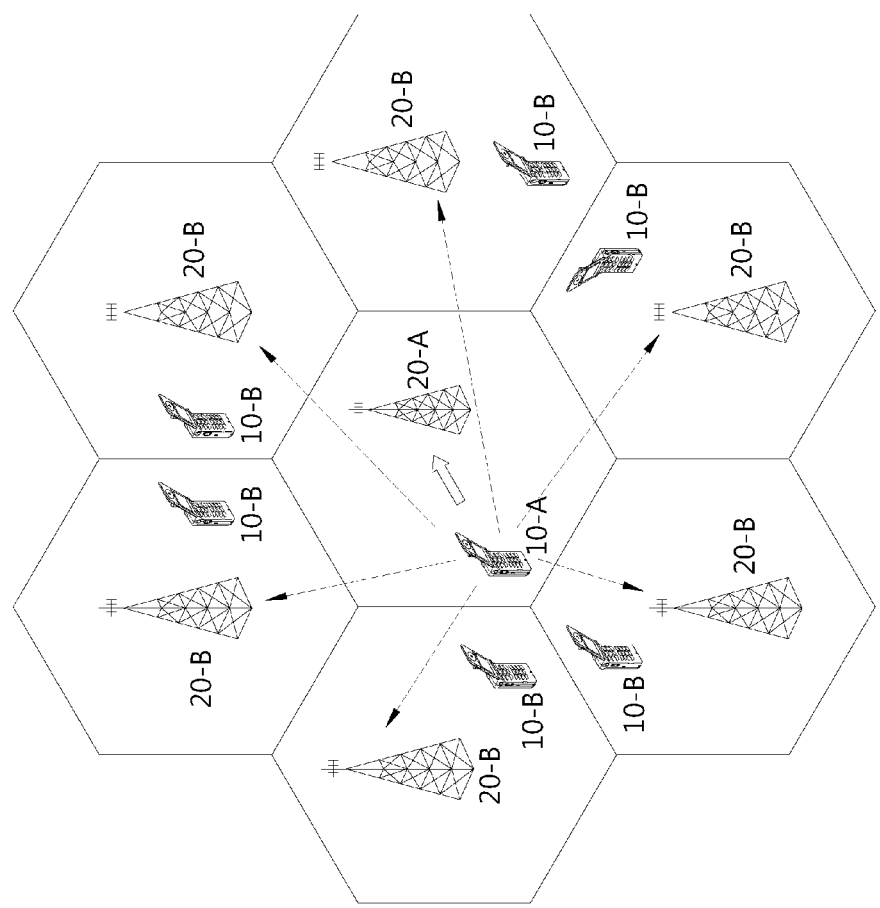
FIG. 1 is an exemplary view showing a wireless communication system in a multi-cell environment.

FIG. 1 is an exemplary view showing a wireless communication system in a multi-cell environment.

Referring to FIG. 1, the wireless communication system includes a base station 20 and at least one mobile station 10. The wireless communication system can be an OFDM or OFDMA-based system. A number of orthogonal subcarriers are used in OFDM.

OFDM uses an orthogonality characteristic between Inverse Fast Fourier Transform (IFFT) and Fast Fourier Transform (FFT). A transmitter sends data by performing IFFT on the data. A receiver restores original data by performing FFT on a received signal. A transmitter uses IFFT to combine a number of subcarriers, and a receiver uses corresponding FFT to separate multiple subcarriers from each other. In the downlink, a transmitter can be a part of the base station 20, and a receiver can be a part of the mobile station 10. In the uplink, a transmitter can be a part of the mobile station 10, and a receiver can be a part of the base station 20.

One or more cells can exist in the base station 20. A cell is an area in which one base station 20 provides communication services. A multi-cell can include a number of base stations having at least one cell.

A base station providing the mobile station 10 with communication service is called a serving base station, and a base station neighboring the serving base station is called a neighbor base station. A cell to which a serving base station belongs is called a serving cell, and a cell to which a neighbor base station belongs is called a neighbor cell.

Here, the serving base station is a base station for anchoring a control signal to a mobile station and can also be called an anchor base station. A cell in which such an anchor base station is covered can be called as an anchor cell.

It is assumed that a base station A 20-A provides a mobile station A 10-A with communication service and a base station B 20-B provides a mobile station B 10-B with communication service. The base station A 20-A is a serving base station for the mobile station A 10-A and a neighbor base station for the base station B 20-B. The base station B 20-B is a serving base station for the mobile station B 10-B and a neighbor base station for the base station A 20-A. It is assumed that the mobile station A 10-A and the mobile station B 10-B are placed at the respective serving boundary of cells.

The base station A 20-A allocates radio resources to the mobile station A 10-A through scheduling, and the mobile station A 10-A sends uplink data to the base station A 20-A through the allocated radio resources. The uplink data sent by the mobile station A 10-A can be received by not only the base station A 20-A, but the base station B 20-B. The uplink data sent by the mobile station A 10-A can give great interference to the base station B 20-B.

In the case in which the base station A 20-A and the base station B 20-B cooperate with each other, antennas placed in each of the base stations are operated with consideration taken of mobile stations placed in the other cell. That is, the antennas can be considered as a multi-antenna system distributed over several cells. Accordingly, a method of the base station A 20-A and the base station B 20-B cooperating with each other or a mobile station sending data to multiple cells can be called a multi-cell cooperation method.

Figure 2:
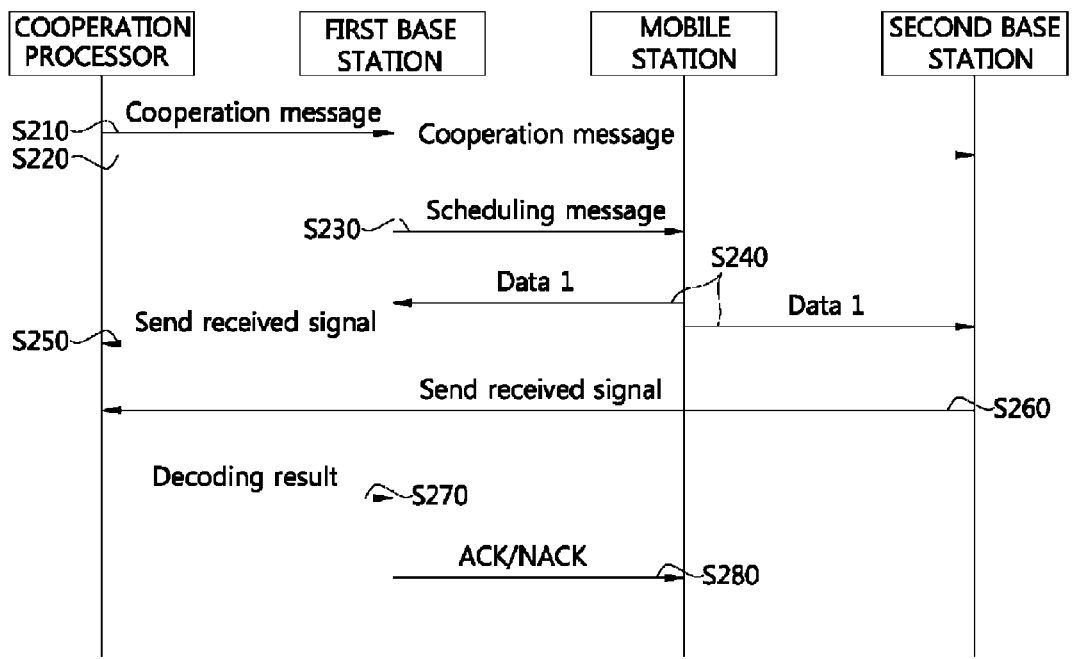
FIG. 2 is a flowchart illustrating an example of a conventional macro diversity operation.

FIG. 2 is a flowchart illustrating an example of a conventional macro diversity operation.

A multi-cell cooperation method includes methods for improving the performance of uplink, such as a macro diversity scheme and an uplink power control method.

First, the uplink power control method is used to reduce interference with neighbor cells by controlling the transmission power of a mobile station at an adequate level. That is, in the case in which a mobile station gives significant interference to neighbor cells, the base station of the neighbor cells can request the mobile station to lower the transmission power. According to this method, interference with neighbor cells can be reduced, but the transmission rate of the mobile station itself is reduced. In other words, the performance of neighbor cells is improved, but the throughput of the entire system is reduced.

The macro diversity system is a scheme in which a plurality of neighbor base stations receives one signal in order to achieve the macro diversity effect. According to this method, the performance of a mobile station having a low transmission rate because of the loss of a path, placed at the boundary of a cell, can be improved.

An operation of a case in which two base stations take part in cooperation in the macro diversity system (i.e., a conventional uplink multi-cell cooperation method) is described below with reference to FIG. 2.

For cooperative communication between first and second base stations, a cooperation processor sends a cooperation message to the first base station at step S210 and sends the second base station at step S220. Here, it is assumed that the first base station is a serving base station. Accordingly, a scheduling message for data transmission is sent from the first base station to a mobile station at step S230.

A transmitter sends data 1 to the first base station and the second base station at step S240. Here, the transmitter can be a relay station or a mobile station. In the example described with reference to FIG. 2, it is assumed that the transmitter is the mobile station.

Thus, the first base station and the second base station receive the same signal corresponding to the data 1. The first base station and the second base station send their received signals to the cooperation processor at steps S250 and S260. Here, the first and second base stations and the cooperation processor can be interconnected over a wireless network or a wired network.

Here, the cooperation processor may be a specific base station which takes part in cooperation or may be a third entity which is placed at the higher place than a base station in the network architecture, such as a Radio Network Controller (RNC). The cooperation processor receives the signals, corresponding to the data 1, from the first base station and the second base station, decodes the data 1 based on the signals, and sends a result of the decoding to the first base station at step S270.

A method of the cooperation processor restoring the data 1 can be various. For example, the method can include a method of combining signals received from base stations and decoding the signals, a method of decoding each of signals received from base stations and selecting one of the decoded signals, and so on.

The cooperation processor can generate one reception signal with high reliability by combining the signals received from the respective base stations and then restore the data 1 by decoding the one signal. Alternatively, the cooperation processor can restore the data 1 by decoding each of signals received from the respective base stations and selecting one of the decoded packets.

The base station sends ACK/NACK messages to the mobile station depending on whether the restoration of each of the signals has been successful at step S280. In the example described with reference to FIG. 2, it is assumed that the first base station sends the ACK/NACK messages to the mobile station.

However, according to the conventional macro diversity scheme, a process of exchanging reception signals between base stations is further required in order to decode data. It leads to a latency in decoding data. Furthermore, the QoS requirements of data cannot be satisfied, or the decoding of data cannot be completed until a point of time at which a base station is scheduled to send ACK/NACK messages.

In particular, in the case in which one of base stations participating in cooperation is a wireless relay station or a femto base station, it is very difficult to use the above macro diversity scheme because the corresponding base station is not directly connected to other cooperation base stations over a wired network. Further, the conventional macro diversity scheme uses multi-user MIMO over multiple cells. In this case, efficiency can be low.

In the case in which multi-user MIMO is used, it will be effective to increase the efficiency of the entire system if a mobile station placed at the boundary of a cell sends some of data for transmission to a base station other than its own serving base station. In particular, this is true of when a mobile station placed at the boundary of a cell is in a channel state in which the mobile station is not allowed for transmission of a high rank to the serving base station, but is allowed for transmission of a high rank when a neighbor base station participates in reception.

However, the existing method has a problem in that it cannot be efficiently operated because a precoding matrix or transmission power which will be used for a mobile station to send data is determined by only a serving base station.

Figure 3:
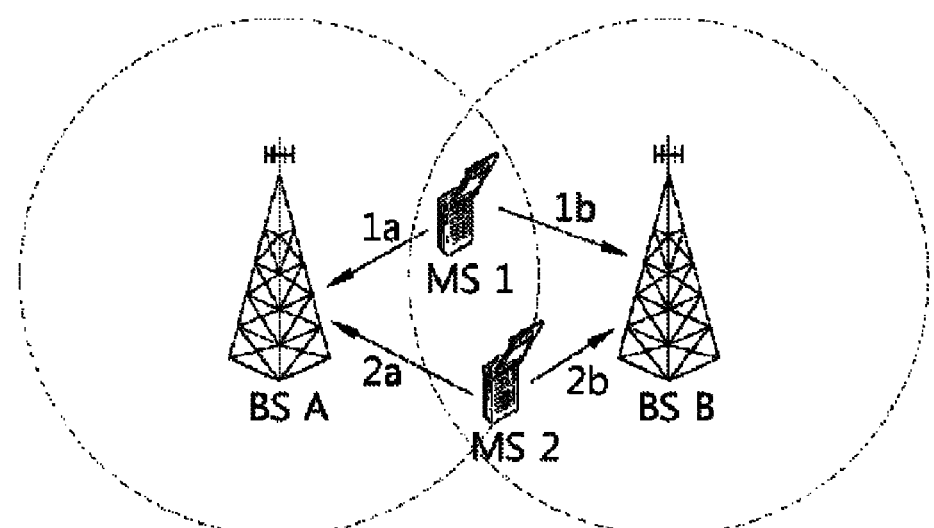
FIG. 3 is a diagram illustrating two neighbor cells to which an embodiment of the present invention can be applied.

FIG. 3 is a diagram illustrating two neighbor cells to which an embodiment of the present invention can be applied. FIG. 3 shows that two transmitters placed at the boundary of two cells send respective signals to two base stations. In this case, the transmitter which sends the signal to the base station can be a relay station or a mobile station. In FIG. 3, however, it is assumed that the transmitter is a mobile station. A method according to an embodiment of the present invention can be applied to not only a mobile station, but a relay station.

The two transmitters are respectively referred to as a mobile station 1 (MS 1) and a mobile station 2 (MS 2). Referring to FIG. 3, a base station (BS) A is the base station of a cell A, and a base station (BS) B is the base station of a cell B. The mobile station 1 and the mobile station 2 are placed at the boundary of the cell A, but from a viewpoint of the mobile station 1, the cell A is a serving cell and the cell B is a neighbor cell. From a viewpoint of the mobile station 2, the cell B is a serving cell, and the cell A is a neighbor cell. The mobile station 1 can give strong interference to the cell B because it is placed at the boundary of the cell A. The mobile station 2 can give relatively small interference to the cell A because it is placed near the center of the cell B.

In the case in which the cell A and the cell B use radio resources of the same time and the same frequency band, they give and receive interference to each other when receiving uplink data. The cell A and the cell B can share scheduling information about the time and frequency resources. For example, the base station A can inform the base station B of scheduling information about the mobile station 1. It is assumed to reduce uplink interference with the cell B when the mobile station 1 sends data to the cell A.

Hereinafter, a cooperative transmission method in a multi-cell environment is described with reference to two neighbor cells illustrated in FIG. 3, for convenience of description. However, it is to be noted that the present invention is not limited to the above example, but can be applied to an example in which two or more neighbor cells exist with reference to one serving cell or an example in which the mobile station 1 is placed near the center of a cell and the mobile station 2 is placed at the boundary of the cell.

It is assumed that, in the present invention, a mobile station connected to a multi-cell wireless network has one serving base station. The serving base station is a base station responsible for primary control on the corresponding mobile station, and it can send or receive a control signal to or from the mobile station. In the embodiment of the present invention, the mobile station can also communicate with neighbor base stations other than the serving base station. Alternatively, the mobile station can communicate with only a base station except for the serving base station, if appropriate.

For example, as shown in FIG. 3, the mobile stations 1 and 2 placed at the boundaries of the cell A and the cell B, respectively, can send a plurality of data streams for uplink data to the cell A and the cell B, respectively. A process of generating the plurality of data streams from the uplink data and mapping the data streams to respective data layers is described in detail below with reference to FIG. 7.

The mobile station 1 can send a data stream 1a to the base station A (i.e., the serving base station) and at the same time can send a data stream 1b (i.e., another data stream) to the base station B (i.e., a neighbor base station).

In a similar way, the mobile station 2 sends a data stream 2a of data 2 to the base station A (i.e., a neighbor base station) through a data layer 2a and a data stream 2b to the base station B (i.e., the serving base station) through a data layer 2b. Such an operation has a possibility that the number of all data streams can be increased as compared with the case in which one mobile station individually communicates with one base station.

For example, if the mobile station 1 and the mobile station 2 are in a channel state in which they can send only one data stream to the base station A and the base station B, respectively, the number of data layers through which each of the mobile stations can send data can be doubled through an operation, such as that shown in FIG. 3. Although the mobile stations are in a channel situation in which they can send two or more data streams to the serving base stations, respectively, if the operation, such as that shown in FIG. 3, is performed, a possible combination of links which can be coupled together by the mobile stations is further diversified. Accordingly, optimized multi-transmission for data streams is made possible.

Figure 4:
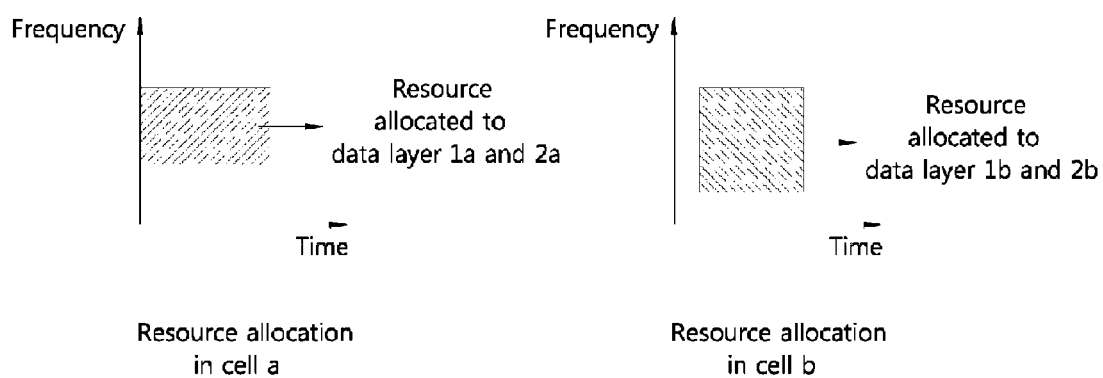
FIG. 4 is a diagram illustrating a method of allocating resources when data are transmitted in the case of FIG. 3.

FIG. 4 is a diagram illustrating a method of allocating resources when data are transmitted in the case of FIG. 3.

The base station A receives the data stream 1a and the data stream 2a. The same radio resources are assigned to the data layer 1a and the data layer 2a to which the data stream 1a and the data stream 2a are respectively mapped, as shown in FIG. 3. The data stream 1a and the data stream 2a are separated from each other through a multi-antenna transmission and reception scheme. That is, a Spatial Division Multiple Access (SDMA) method is applied to the transmission and reception of data streams.

In a similar way, the base station B receives the data stream 1b and the data stream 2b through the data layer 1b and the data layer 2b, respectively, according to the SDMA method. The radio resources assigned for the transmission of the data streams which are received by the base station A and the base station B can be identical with each other, or may be different from each other except for some of the radio resources, which overlap with that shown in FIG. 3. Alternatively, the radio resources used in the cells may have a relationship in which the radio resources of one cell are included in the radio resources of the other cell.

Figure 5:
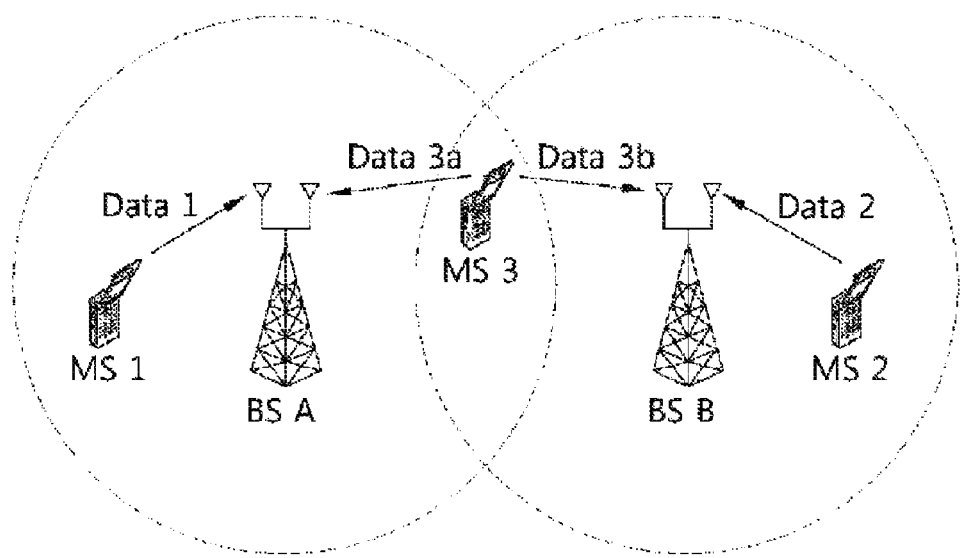
FIG. 5 is a diagram illustrating that a transmitter located at the boundaries of two cells sends signals to two base stations.

FIG. 5 is a diagram illustrating that a transmitter located at the boundaries of two cells sends signals to two base stations. The transmitter sending the signals to the base stations can be a mobile station, a relay station, etc. However, it is assumed that the transmitter is a mobile station.

According to another embodiment of the present invention, as shown in FIG. 5, a mobile station 1 and a mobile station 2 send respective signals to respective serving base stations. In other words, the mobile station 1 sends the signal to a base station A, and the mobile station 2 sends the signal to a base station B.

Further, a mobile station 3 placed at the boundaries of the two cells can send a plurality of data streams to different base stations. According to the embodiment shown in FIG. 5, the mobile station 3 sends a data stream 3a to the base station A and sends a data stream 3b to the base station B.

In this case, the data stream 3a is subject to SDMA with the data 1 of the mobile station 1, and the data stream 3b is subject to SDMA with the data 2 of the mobile station 2. Here, the data 1 and the data 2 can include two or more data streams. Even in this case, radio resources assigned to transmit the data stream 3a and the data stream 3b are not necessarily identical with each other.

Figure 6:
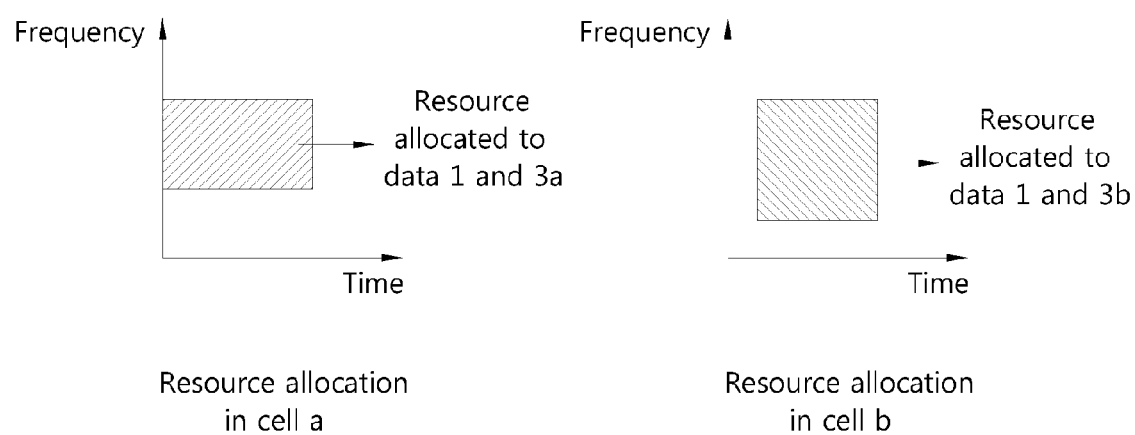
FIG. 6 is a diagram illustrating a method of allocating resources in the case of FIG. 5.

The radio resources assigned to transmit the data stream 3a and the data stream 3b are illustrated in FIG. 6. As a special case of such an operation, one data stream is subject to SDMA with data sent by another mobile station, another data stream transmitted simultaneously with the one data stream may not be subject to SDMA with other data. For example, in the example shown in FIG. 5, the mobile station 2 may not send any data.

Such an operation is advantageous in the case in which each cell schedules a mobile station and the number of data streams which can be sent by another mobile stations within the corresponding cell through SDMA is limited. As described above, a user's mobile station placed at the boundaries of cells send a plurality of data streams to each of different base stations. Accordingly, a total number of data streams received by a base station are not greatly changed, and the number of data streams sent by a specific mobile station can be increased.

FIG. 6 is a diagram illustrating a method of allocating resources in the case of FIG. 5.

According to the resource allocation method described with reference to FIG. 6, different radio resources can be assigned to data streams transmitted to different base stations, like the resource allocation method described with reference to FIG. 4.

That is, according to an embodiment of the present invention, even in the case of a plurality of data streams transmitted by one mobile station, radio resources assigned to send the respective data streams can differ from each other. Accordingly, the data streams can be transmitted through the respective radio resources with different positions or sizes.

In other words, the data layer 1a and the data layer 1b which are used by the mobile station 1 can be assigned to different radio resources. In order for such an operation to be possible, information about the position and the size of radio resources assigned to each data layer or frequency information and time information about the radio resources can be transmitted to the mobile station before sending the data streams.

Accordingly, the information about the radio resources can be included in a scheduling message which is sent from the base station to the mobile station. That is, the mobile station can know in advance through which radio resources the data streams will be transmitted to respective base stations by receiving the scheduling message.

The scheduling message can be received from each of the base stations which will receive each of the data streams. Alternatively, information about the allocation of radio resources regarding transmission of a plurality of data streams can be received from a serving base station or one base station functioning as an anchor base station in a bundle.

Figure 7:
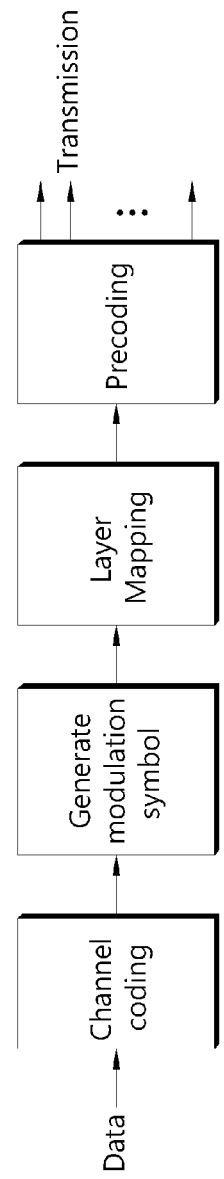
FIG. 7 shows the operation of a transmitter having a multi-antenna.

FIG. 7 shows the operation of a transmitter having a multi-antenna. Here, the transmitter can be a mobile station which performs cooperative transmission according to the embodiment of the present invention. The transmitter can further include a channel encoder, a mapper, and a precoder.

[Channel Coding]

Uplink data first experience a channel coding process. The channel coding process can be performed by the channel encoder within the transmitter. The channel encoder encodes received information bits according to a preset coding method and generates a codeword.

In this case, a plurality of codewords can be generated. The plurality of codewords is generated by a plurality of the channel encoders. In the case in which the plurality of codewords are respectively assigned a first codeword, a second codeword, an nth codeword, etc., the first codeword can be generated by the first channel encoder, and a second codeword can be generated by a second channel encoder.

[Generation of Modulation Symbol]

The generated codewords are modulated according to a predetermined modulation method and mapped to modulation symbols having a demodulation value. The modulation method is not limited and can be an m-Phase Shift Keying (m-PSK) method or an m-Quadrature Amplitude Modulation (m-QAM) method. For example, m-PSK can be BPSK, QPSK, or 8-PSK, and m-QAM can be 16-QAM, 64-QAM, or 256-QAM.

Assuming that, in the channel coding process, the first codeword and the second codeword have been generated, a modulation symbol for the first codeword CW1 and a modulation symbol for the second codeword CW2 are generated. In this case, the transmitter includes the mappers, and each of the mappers can perform modulation for each of the codewords. Generation of the modulation symbol for the first codeword can be performed by a first mapper, and generation of the modulation symbol for the second codeword can be performed by a second mapper.

Accordingly, in this example, in order to process the two codewords (i.e., the first codeword and the second codeword), the transmitter is illustrated to include the two channel encoders and the two mappers. However, the number of channel encoders and the number of mappers, included in the transmitter, is not limited. The transmitter 100 can include at least one channel encoder and at least one mapper for processing at least one codeword.

[Layer Mapping]

After the modulation symbols are generated, a process of mapping the modulation symbols, corresponding to the respective codewords (i.e., the first codeword and the second codeword), to respective data layers according to the number of data layers is performed. Layer mapping refers to such a process. The data layer can be an information path leading to the precoder, and the number of data layer corresponds to the value of a rank.

If the number of data layers (i.e., ranks) is determined, the transmitter maps the modulation symbols of the codewords to the respective data layers.

[Precoding]

The transmitter can include the precoder. The precoder is configured to process the mapping symbols, mapped to the respective data layers, using the MIMO method according to a plurality of antenna ports and to output antenna-specific symbols.

[Transmission]

Next, the processed antenna-specific symbols are converted into transmission signals and then transmitted through the respective antenna ports. Here, as described above, since the transmitter includes the multi-antenna and so includes the plurality of antenna ports. The transmitter can generate the transmission signals using a modulation method, which is well known to those having ordinary skill in the art, such as an OFDM modulation method or an SC-FDMA modulation method. Here, the transmission signals, which are mapped to the respective data layers and then transmitted, can be called data streams.

The transmitter can support a Hybrid Automatic Repeat Request (HARQ). Upon retransmission for the HARQ, the same layer mapping process as the initial transmission process may be performed, or layer mapping for retransmission may be performed. Further, each of the data streams can be controlled through the precoding process such that mutual interference between the data streams is small.

Some of the plurality of data streams can be the results of demultiplexing coded bits which have experienced the same channel coding process. Of course, since the codewords need not to be necessarily plural, all the data streams may be the results of one channel coding.

In the case in which the transmitter sends the data streams to each of a plurality of base stations through the precoding process through uplink transmission, reception base stations that the data streams will reach may be different from each other, but some of the data streams can be sent to the same reception base station.

In particular, data streams to be sent to the same base station can be set such that they are the results of the one channel coding process. Accordingly, a reception base station can process only one codeword, thereby being capable of facilitation transmission of the ACK/NACK messages.

In a similar way, data streams generated through the same channel coding process can be set such that they are sent to different reception base stations. Accordingly, a signal forming one codeword can be prevented from being received by two or more base stations. The serving base station of the corresponding mobile station can be included in the reception base station that receives the signal of the mobile station.

Figure 8:
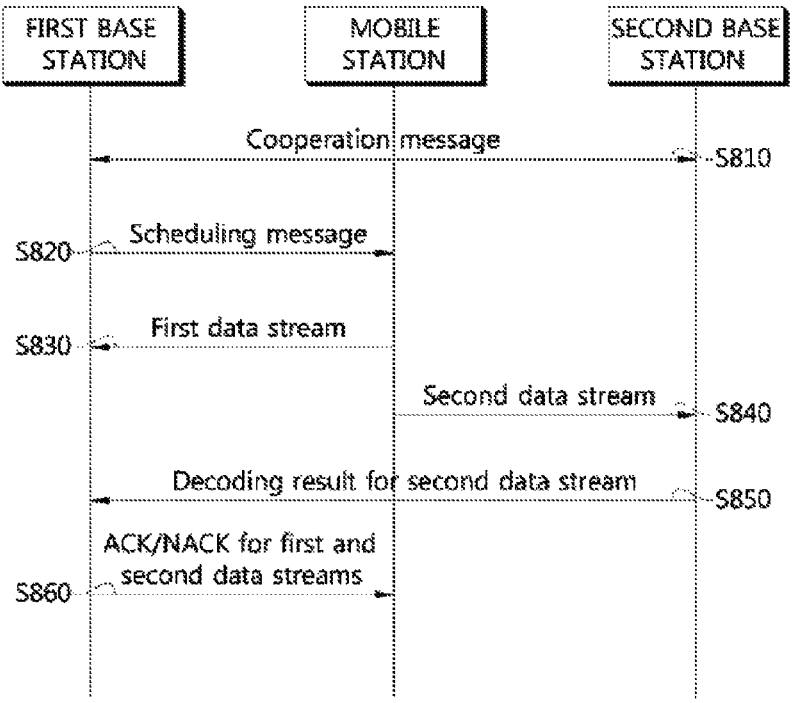
FIG. 8 is a diagram illustrating a cooperative transmission method toward a plurality of base stations according to an embodiment of the present invention.

FIG. 8 is a diagram illustrating a cooperative transmission method toward a plurality of base stations according to an embodiment of the present invention.

FIG. 8 shows an embodiment in which a plurality of base stations includes a serving base station or an anchor base station and a first base station plays the role of the serving base station. Accordingly, referring to FIG. 8, the first base station sends and receives a control signal, which is sent by another base station (i.e., a second base station) taking part in a data transmission process, to and from a transmitter in lieu of the second base station. Here, the control signal can correspond to an uplink scheduling message or ACK/NACK messages depending on whether transmission of data streams is successful.

A plurality of data streams generated through processes, such as channel coding, layer mapping, and precoding, is referred to a first data stream and a second data stream. Although the first data stream and the second data stream are described as an example for easy of description and understanding, the number of data streams is not limited thereto.

Further, the plurality of data streams is mapped to a plurality of respective data layers and then transmitted. The data layer to which the first data stream is mapped is called a first data layer, and the data layer to which the second data stream is mapped is called a second data layer, for convenience of description. Even in this case, although the first data layer and the second data layer are described as an example, the number of data layers is not limited thereto. The same principle is applied to other embodiments to be described later.

Radio resources assigned to transmit the first data stream and the second data stream can have different sizes and positions. A method of assigning the radio resources and a process of transmitting information about the assignment of the radio resources to a mobile station have already been described above.

First, the first base station and the second base station exchange a cooperation message at step S810. The base stations can perform cooperative transmission because they share the cooperation message. According to a cooperation method between the first base station and the second base station, the transmitter can send data. Any one of the first base station and the second base station can be a serving base station. In the present embodiment, the first base station plays the role of the serving base station in a relationship with the transmitter.

According to cooperation between the base stations, the transmitter receives a scheduling message from the first base station at step S820. As described above, although an example in which the transmitter is a mobile station is described, a relay station can also play the role of the transmitter described with reference to FIG. 8 or 9. Further, since the first base station plays the role of a serving base station or an anchor base station performing cooperative transmission, of the plurality of base stations, a control signal such as the scheduling message is sent from the first base station to the mobile station. The same principle applies to ACK/NACK messages to be described later.

The scheduling message, received by the mobile station from the first base station, is used to schedule the transmission of the first data stream and the second data stream. Scheduling information for uplink transmission to the first base station and the second base station is collected by the first base station. In response to the scheduling message, the mobile station sends the first data stream to the first base station at step S830 and sends the second data stream to the second base station at step S840.

Next, the second base station sends a result of decoding the second data stream to the first base station (i.e., the serving base station) at step S850.

When the first data stream and the second data stream are respectively sent to the first base station and the second base station through uplink transmission and the first base station receives the decoding result for the second data stream from the second base station, the first base station sends ACK/NACK messages for the first data stream and the second data stream to the mobile station at step S860.

Figure 9:
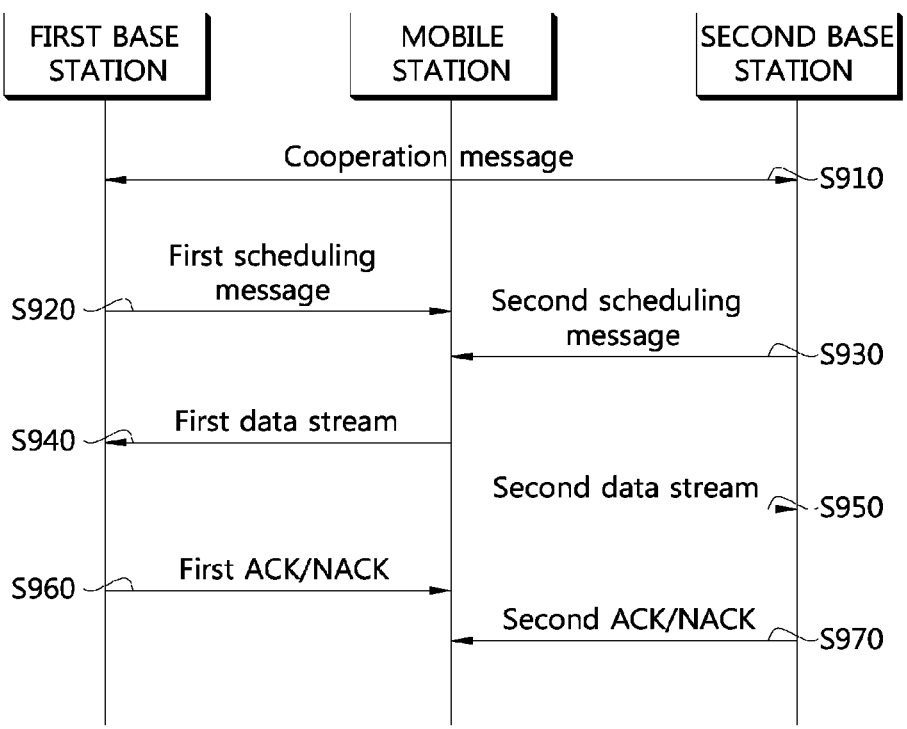
FIG. 9 is a diagram illustrating a cooperative transmission method toward a plurality of base stations according to another embodiment of the present invention.

FIG. 9 is a diagram illustrating a cooperative transmission method toward a plurality of base stations according to another embodiment of the present invention.

FIG. 9 shows an embodiment in which a base station, playing the role of a serving base station or an anchor base station, is not included in the plurality of base stations. Accordingly, referring to FIG. 9, a first base station and a second base station are included in the plurality of base stations which receives a data stream from a transmitter. Each of the base stations directly sends and receives a control signal in a relationship with the transmitter. In the present embodiment, a case in which the transmitter is a mobile station is described as an example.

Here, the control signal can correspond to an uplink scheduling message or ACK/NACK messages depending on whether data streams have been successfully sent.

Accordingly, in the embodiment described with reference to FIG. 9, the first base station directly sends the uplink scheduling message for the uplink transmission of the first data stream to the mobile station and also directly sends the ACK/NACK messages depending on whether the first data stream has been received to the mobile station. In a similar way, the second base station directly sends the uplink scheduling message for the uplink transmission of the second data stream to the mobile station and also directly sends the ACK/NACK messages depending on whether the second data stream has been received to the mobile station.

Here, the ACK/NACK messages corresponding to the transmission of the first data stream can be called first ACK/NACK messages, and the ACK/NACK messages corresponding to the transmission of the second data stream can be called as second ACK/NACK messages.

In the present embodiment, radio resources assigned to transmit the first data stream and the second data stream can have different sizes or positions. A method of assigning the radio resources, a process of transmitting information about the assignment of the radio resources to the mobile station, etc. have been described above.

First, the first base station and the second base station exchange a cooperation message at step S910. In the same manner as the embodiment described with reference to FIG. 8, the base stations can perform cooperative transmission because they share the cooperation message. Further, the mobile station can send data according to a cooperation method between the first base station and the second base station.

The mobile station receives the scheduling messages from the first base station and the second base station at steps S920 and S930. The scheduling message received from the first base station in order to send the first data stream can be called a first scheduling message, and the scheduling message received from the second base station in order to send the second data stream can be called a second scheduling message.

Accordingly, in an embodiment in which data streams generated from different codewords are set to be sent to different base stations, the first data stream and the second data stream which are sent by different base stations and whose ACK/NACK messages for the data streams are also separately sent can be data streams generated from different codewords.

In response to the scheduling messages, the mobile station sends the first data stream to the first base station at step S940 and sends the second data stream to the second base station at step S950.

As described above, the first scheduling message which has been received by the mobile station from the first base station is a scheduling message for transmission of the first data stream. Accordingly, the mobile station receives scheduling information, including information about the allocation of radio resources for the transmission of the first data stream, from the first base station.

In a similar way, the second scheduling message which has been received by the mobile station from the second base station is a scheduling message for transmission of the second data stream. Accordingly, the mobile station receives scheduling information, including information about the allocation of radio resources for the transmission of the first data stream, from the second base station.

In the embodiment shown in FIG. 9, as described above, a base station playing the role of an anchor base station is not determined. Accordingly, each of the base stations sends a control signal, such as the scheduling message, to the mobile station without a process of collecting the control signals.

When the first data stream and the second data stream are respectively sent to the first base station and the second base station through uplink transmission, the first and second base stations send the first and second ACK/NACK messages, respectively, to the mobile station at steps S960 and S970.

In the embodiment described with reference to FIGS. 8 and 9, in order for the transmitter to send the uplink signals to the plurality of base stations, the serving base station can provide the transmitter with appropriate scheduling information.

The scheduling information can include the ID of a transmitter (e.g., C-RNTI of a mobile station in a 3GPP E-UTRA system), information about the Modulation and Coding Scheme (MCS) of each data layer, index information about a precoding matrix which will be used to send data streams, and so on.

The precoding matrix can use a beam coordination method of determining each precoding column vector such that interference resulting from other data layers which are transmitted from a corresponding transmitter to each of base stations can be minimized through the exchange of channel information between base stations which take part in cooperative transmission. The scheduling information can further include the size and position of data layer-based time-frequency resources corresponding to one transmitter.

In the embodiment in which uplink transmission is performed on a plurality of base stations, the scheduling information can be transmitted by a transmitter, or the serving base station of a mobile station coupled to a transmitter. To this end, the serving base station can exchange information necessary for the scheduling information with base stations other than a serving base station through a backhaul link.

The information necessary for the scheduling information can include information about, for example, a channel state measured by a destination base station, an MCS level that can be received by a destination base station, and a precoding matrix index suitable for a destination base station.

The serving base station can generate appropriate scheduling information based on the information and send the generated information to a corresponding transmitter. In order for different base stations to effectively perform decoding, a transmitter can use different dedicated Reference Signals (RS) for respective data layers. In this case, a dedicated reference signal, which will be used by the transmitter for each data layer, is indicated in corresponding scheduling information.

Further, in order to control transmission power, index information about reception base stations which will receive data streams through respective data layers can be included in the scheduling information.

The embodiment of the present invention includes a case in which each of a number of destination base stations sends scheduling information about a data layer to which a data stream, which will be received by each destination base station, has been mapped to a transmitter. In this case, the transmitter needs to be able to receive a control signal, which is sent by base stations as well as a serving base station, and the ID of the transmitter can be set differently from the base stations, if appropriate.

When a transmitter sends or relays a signal, reception base stations that have received the signal inform the transmitter of decoding results through respective ACK/NACK messages. Each of the reception base stations can send the ACK/NACK messages. In this case, the transmitter needs to be able to receive the ACK/NACK messages, which are sent by base stations other than a serving base station. The scheduling information includes the index of a destination base station (i.e., from which a mobile station must receive the ACK/NACK messages for a corresponding data layer), which will send the ACK/NACK messages for each data layer.

In addition, a serving base station or each reception base station can inform the position and the size of resources through which ACK/NACK messages corresponding to each data layer will be sent through a signaling field or an upper layer signal within scheduling information (for example, scheduling information included in the PDCCH of a 3GPP E-UTRA system).

Alternatively, each reception base station can inform a serving base station whether data have been successfully received through a backhaul link between base stations. The serving base station can collect such pieces of information and send ACK/NACK messages, informing whether transmission of each data layer has been successful, to a transmitter.

In this case, some latency occurs in collecting pieces of information about whether reception is successful through the backhaul link. Accordingly, the serving base station can inform the corresponding transmitter of such latency which can be generated until the ACK/NACK messages are sent to the transmitter through a signaling field or an upper layer signal within scheduling information.

Such a method can have an advantageous effect in terms of the capacity of a backhaul link or latency as compared with the existing method of collecting signals, received by respective base stations, using a serving base station or a cooperation processor and decoding the collected signals.

Further, a transmitter can perform control of power in sending or relaying and sending an uplink signal. Such power control is classified into open-loop power control for estimating the loss of a path from a base station and controlling transmission power in order to compensate for the loss and close-loop power control in which a base station directly indicates a change in the transmission power in order to correct errors in the open-loop power control method and to deal with a rapid change in the channel.

First, in the open-loop control method, a transmitter sets transmission power for a data layer based on an estimation value for the loss of a path with a reception base station, which is received through the corresponding data layer. To this end, the transmitter measures the reference signal of base stations included in a list of the reception base station, which is acquired through scheduling information, and estimates the loss of a path based on a result of the measurement.

A close-loop control signal may be sent by a serving base station which collects power control indications from serving base stations, or each reception base station can send a power control indication signal for its own data layer.

For such close-loop power control, a base station must be able to estimate an uplink MIMO channel through a sounding reference signal. To this end, base stations participating in cooperation can cooperate with each other and assign a reference signal to the multi-antenna of a transmitter. For example, if each transmission antenna alternatively sends a sounding reference signal to a mobile station as in the 3GPP E-UTRA system, each base station can estimate the MIMO channel.

Accordingly, in general, it is advantageous to increase the entire transmission rate by independently performing power control on data layers which are sent to respective base stations such that transmission power between the data layers relatively differs.

In order to demodulate data whose transmission power is controlled for every data layer, a dedicated reference signal is used for every data layer, and transmission power for each data layer, together with a reference signal, is controlled. Accordingly, demodulation and decoding for QAM data are made possible.

A transmitter can inform each reception base station of the ratio of transmission power, which is occupied by each data layer, the ratio of a pilot to transmission power of each data layer, etc. through a control channel or an upper layer signal.

Figure 10:
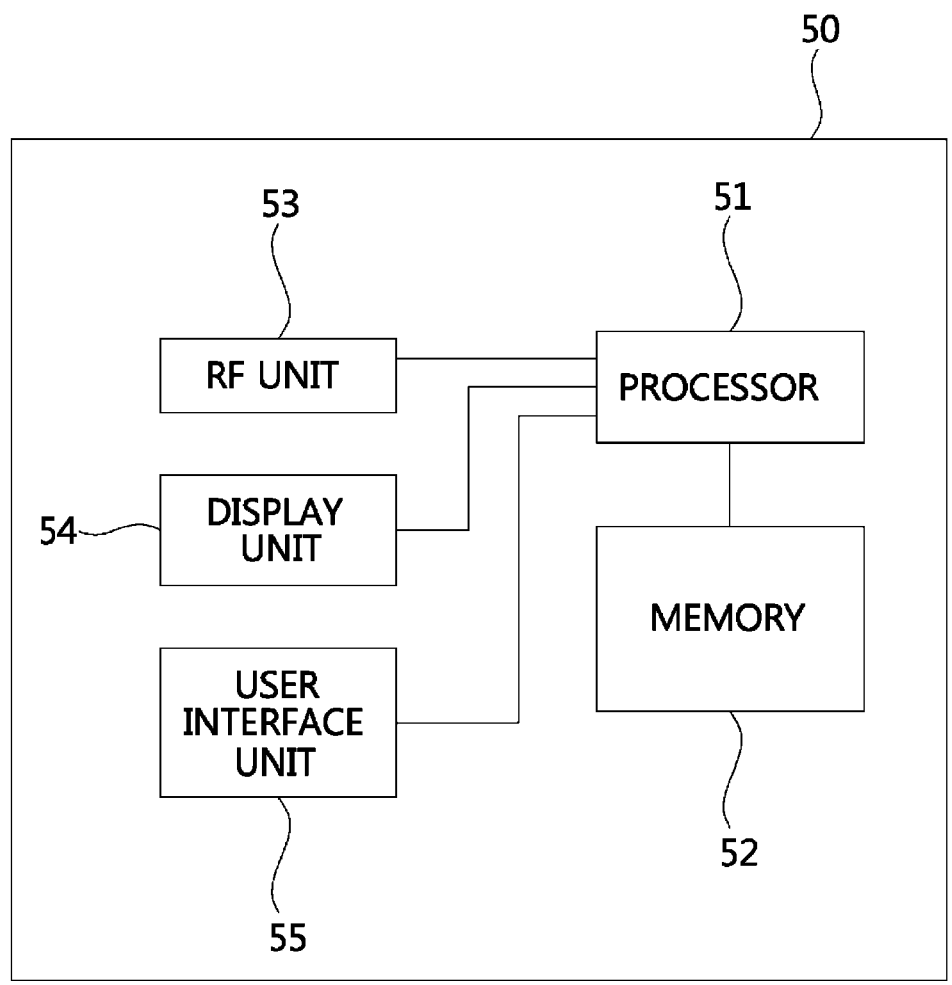
FIG. 10 is a block diagram of the elements of a mobile station.

FIG. 10 is a block diagram of the elements of a mobile station. The mobile station described with reference to FIG. 10 can be an example of a transmitter which performs cooperative transmission according to the embodiment of the present invention.

A mobile station 50 includes a processor 51, memory 52, an RF unit 53, a display unit 54, and a user interface unit 55. The processor 51 has the layers of a wireless interface protocol implemented therein and provides a control plane and a user plane.

The function of each of the layers can be implemented through the processor 51. The memory 52 is coupled to the processor 51 and is configured to store a mobile station driver system, applications, and general files. The display unit 54 displays several pieces of information of a mobile station and can include a well-known device, such as a Liquid Crystal Display (LCD) or Organic Light Emitting Diodes (OLED). The user interface unit 55 can be implemented using a combination of well-known user interface units, such as the keypad or the touch screen. The RF unit 53 is coupled to the processor 51 and is configured to transmit and receive radio signals.

The processor of the mobile station can perform the data transmission method according to the embodiments of the present invention. That is, in the case in which a mobile station is placed at the boundaries of cells, the processor of the mobile station can send a cooperation message to a plurality of neighbor base stations, generate a plurality of data streams, and send the data streams to a plurality of base stations which participates in cooperative transmission.

Further, the mobile station or the processor of the mobile station can perform a process, such as channel coding or demultiplexing. The process pertinent to generation of such data streams has been described above with reference to FIGS. 7, 8, and 9, and a description thereof is omitted.

Here, the plurality of base stations can include a serving base station. Further, the mobile station can be assigned different radio resources in order to send respective data streams. The mobile station can receive scheduling information, including information about the assignment of radio resources for the transmission of respective data streams, and a control signal, such as ACK/NACK messages depending on the transmission of each data stream, from the base stations which have received the respective data streams, or receive any one base station playing the role of a serving base station.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting uplink data in a wireless network, the method comprising:
obtaining, by a user equipment (UE) from a first base station, a first index of the first base station and a second index of a second base station,
wherein the first base station is a serving base station for the UE;
generating, by the UE, a first reference signal to be used by the first base station, the first reference signal to be used by the first base station being based on the first index of the first base station;
transmitting, by the UE to the first base station, first uplink data and the first reference signal,
wherein the first reference signal is one of a channel estimation reference signal, a demodulation reference signal and a decoding reference signal;
generating, by the UE, a second reference signal to be used by the second base station, the second reference signal being based on the second index of the second base station;
transmitting, by the UE to the second base station, second uplink data and the second reference signal,
wherein the second reference signal is one of a channel estimation reference signal, a demodulation reference signal and a decoding reference signal; and
receiving an ACK/NACK from the first base station indicating whether or not the second base station successfully received the second uplink data.

2. A user equipment (UE) for transmitting uplink data in a wireless network, the UE comprising:
a radio frequency (RF) unit; and
a processor coupled to the RF unit and configured to:
obtain, from a first base station, a first index of the first base station and a second index of a second base station,
wherein the first base station is a serving base station for the UE,
generate a first reference signal to be used by the first base station, the first reference signal to be used by the first base station being based on the first index of the first base station,
transmit, to the first base station, first uplink data and the first reference signal,
wherein the first reference signal is one of a channel estimation reference signal, a demodulation reference signal and a decoding reference signal
generate a second reference signal to be used by the second base station, the second reference signal being based on the second index of the second base station,
transmit, to the second base station, second uplink data and the second reference signal,
wherein the second reference signal is one of a channel estimation reference signal, a demodulation reference signal and a decoding reference signal, and
receive an ACK/NACK from the first base station indicating whether or not the second base station successfully received the second uplink data.

* * * * *